United States Patent [19]
Fernsler et al.

[11] Patent Number: 4,581,630
[45] Date of Patent: Apr. 8, 1986

[54] CONSTANT WIDTH BURST GATE KEYING PULSE GENERATOR

[75] Inventors: Ronald E. Fernsler; Thomas D. Yost, both of Indianapolis, Ind.

[73] Assignee: RCA Corporation, New York, N.Y.

[21] Appl. No.: 527,889

[22] Filed: Aug. 30, 1983

[51] Int. Cl.[4] .......................................... H04N 9/455
[52] U.S. Cl. ................................................. 358/20
[58] Field of Search ................................ 358/20, 150

[56] References Cited

U.S. PATENT DOCUMENTS

| | | | |
|---|---|---|---|
| 3,544,708 | 12/1970 | Buechel | 358/20 |
| 4,051,518 | 9/1977 | Sendelweck | 358/20 |
| 4,149,180 | 4/1979 | Lovely | 358/20 |
| 4,173,023 | 10/1979 | Lagoni et al. | 358/20 |
| 4,228,456 | 10/1980 | Lovely | 358/20 |
| 4,263,610 | 4/1981 | Shanley, II et al. | 358/20 |
| 4,295,163 | 10/1981 | Hettiger | 358/165 |
| 4,410,907 | 10/1983 | Vinekar et al. | 358/20 |

FOREIGN PATENT DOCUMENTS 52-35519  3/1977  Japan ..................................... 358/20

*Primary Examiner*—John W. Shepperd
*Attorney, Agent, or Firm*—Paul J. Rasmussen; Joseph Laks; Scott J. Stevens

[57] ABSTRACT

A keying pulse generator for a color television burst gate provides a gating pulse in response to horizontal synchronizing pulses when present and in response to horizontal retrace pulses when sync pulses are absent. A timing circuit is provided to maintain a constant width keying pulse independent of video signal condition and receiver operating characteristics.

1 Claim, 5 Drawing Figures

CONSTANT WIDTH BURST GATE KEYING PULSE GENERATOR

This invention relates to keying pulse generators for use in color television receivers which produce keying pulses under varying signal strength conditions.

The composite video signal for a color television receiver horizontal scan line includes luminance and chrominance information occurring during an image interval and synchronizing and phasing information that occurs during a blanking interval. The luminance and chrominance information is decoded by appropriate receiver luminance and chrominance processing circuitry and is used to control the operation of an electron gun assembly in a color picture tube. The synchronizing and phasing information includes horizontal sync pulses and a chrominance burst signal which is used to synchronize the 3.58 MHz color oscillator. The burst signal is applied to the appropriate chrominance processing circuitry via a burst gate which is energized by a burst gate keying pulse.

A portion of the composite video signal occurring during the blanking interval is also used by some receivers to determine a black level reference signal which maintains the brightness of the reproduced picture by a brightness control circuit.

The aforementioned luminance-channel brightness control circuit and chrominance-channel color burst gate both utilize information contained in the back porch region of the horizontal video blanking interval. It may be desirable to use one keying pulse to energize both the brightness control circuit and the chrominance burst gate. The timing and duration of this keying pulse is very important, however, as the pulse must be of sufficient duration to key enough information into the luminance and chrominance processing circuits. Also, the leading edge of the keying pulse must not occur too soon or the brightness control circuits may respond to the horizontal synchronizing pulse. The trailing edge of the keying pulse must not occur too late; otherwise, video information may be keyed into the burst gate, disrupting its operation. When the keying pulse is also used by the brightness control circuit, the absence of a keying pulse may cause undesirable brightness variations.

U.S. Pat. No. 4,410,907 issued Oct. 18, 1983, in the names of S. R. Vinekar et al. and entitled, "Burst Gate Keying and Back Porch Clamp Pulse Generator", describes a pulse generator which utilizes both horizontal sync and horizontal retrace pulses to form the desired keying pulses. Under strong signal conditions, the horizontal sync pulses are used to trigger the initiation of the keying pulses, so that an accurately timed keying pulse occurs each horizontal line. Under weak or noisy signal conditions when the horizontal sync pulses may be distorted or missing, the horizontal retrace pulses are used to trigger the keying pulse generator so that a keying pulse is provided under all receiver operating conditions. The previously described patent application uses a horizontal retrace pulse-derived signal to terminate the keying pulse under all conditions. Some receiver signal processing systems may have constraints which cause the trailing edge of the keying pulse to occur too late. Also, variations in electron beam current may cause phase shifting of the retrace pulse with respect to the sync pulse, which may result in changes in width of the generated keying pulses.

The present invention provides a pulse generator which produces a keying pulse of constant width under all receiver operating conditions. The keying pulse generator is triggered by horizontal synchronizing pulses under strong, relatively noise-free conditions and by horizontal flyback pulses under weak, noisy signal conditions.

In accordance with an aspect of the present invention, a keying pulse generator is provided for use in a television receiver. The receiver includes a source of horizontal retrace pulses and a source of horizontal synchronizing pulses. The keying pulse generator comprises a circuit that is responsive to the synchronizing pulses for initiating the keying pulse when the amplitude of the synchronizing pulse is above a predetermined level and responsive to the retrace pulses for initiating the keying pulses when the amplitude of the synchronizing pulses are below a predetermined level. A circuit responds to the initiation of the keying pulse and terminates the keying pulse after a predetermined interval.

In the accompanying drawing, FIG. 1 is a block diagram of a portion of a color television receiver incorporating a keying pulse generator in accordance with an aspect of the present invention;

Figure 1:
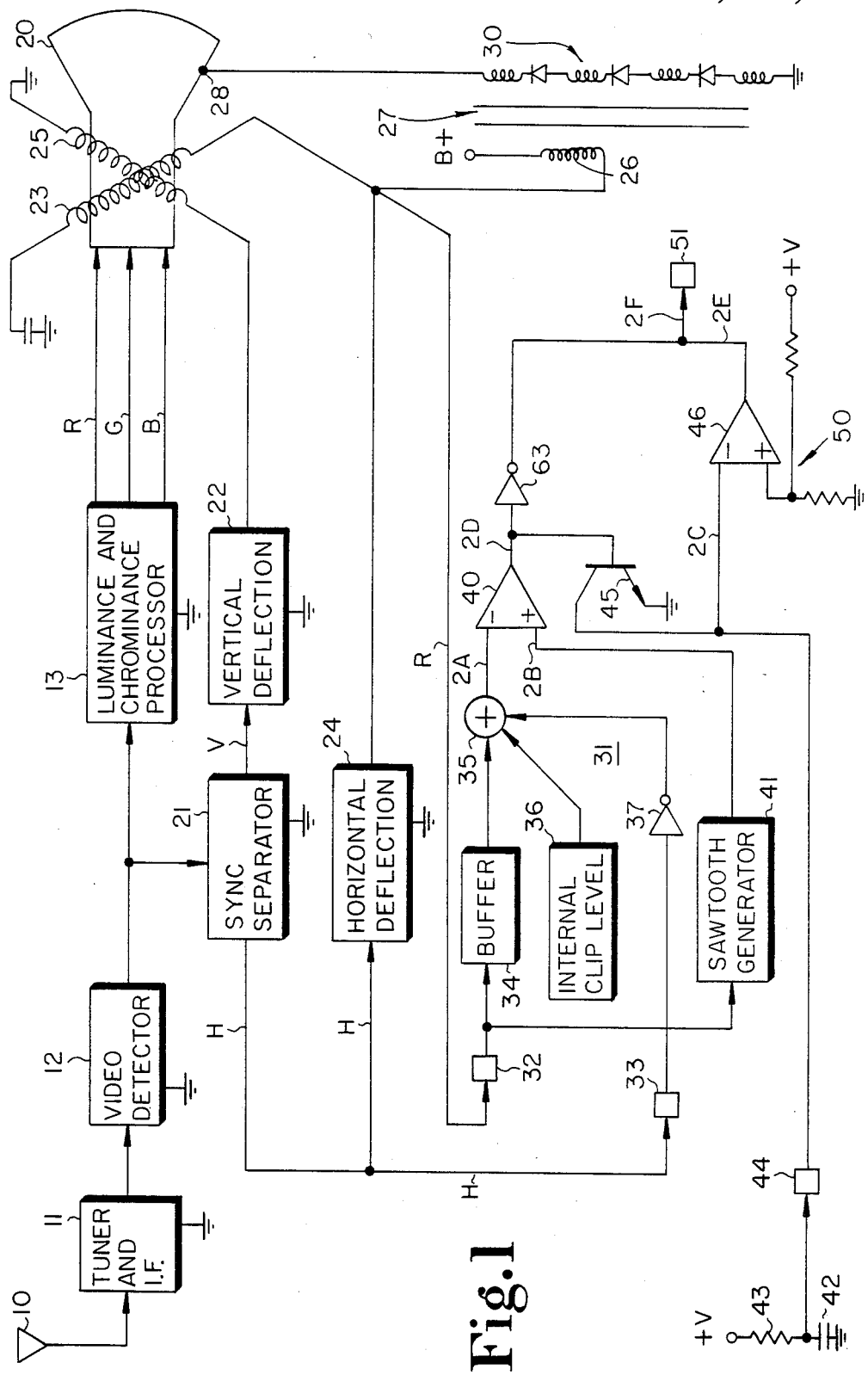

In the television receiver shown in FIG. 1, an antenna 10 receives television signals which are applied to tuner and intermediate frequency (IF) circuits 11. The signal from tuner and IF circuits 11 is applied to a video detector 12 which generates a composite video signal. The composite video signal, comprising chrominance, luminance and receiver synchronizing information is applied to luminance and chrominance processing circuits 13 which extract appropriate information from the video signal. Luminance and chrominance processing circuits 13 may, for example, include a brightness control circuit (not shown) which maintains desired picture brightness by sampling the blanking reference level of the back porch portion of the composite video signal and a burst gate which applies the color burst signal, also located in the back porch interval of the composite video signal, to a color oscillator in order to provide proper synchronization of the oscillator.

The processed luminance and chrominance information from the luminance and chrominance circuits 13 provides red, green and blue drive signals R, G and B, respectively, which are applied to the electron gun assembly (not shown) of a kinescope 20.

The composite video signal from video detector 12 is also applied to a sync separator or stripper 21, which removes the horizontal and vertical synchronizing pulses from the composite video signal to form a composite sync signal. Sync separator 21 may also include, for example, a sync pulse integrator and a sync pulse differentiator for generating vertical and horizontal sync signals, respectively, from the composite sync signal. The vertical sync pulses are applied via conductor V to vertical deflection circuits 22, which generate a deflection current in vertical deflection coils 25 located on kinescope 20. The horizontal sync pulses are applied to horizontal deflection circuits 24 via conductor H. Horizontal deflection circuits 24 produce a deflection current in horizontal deflection coils 23, located on kinescope 20, which generates a deflection field that causes the electron beam produced by the electron gun assembly of kinescope 20 to form a scanned raster on the display screen of kinescope 20.

Power to horizontal deflection circuits 24 is provided from a regulated supply, designated B+, via a primary winding 26 of a high voltage transformer 27. Horizontal deflection circuits 24 produce horizontal retrace pulses which are applied to winding 26 in order to generate, by transformer action with a secondary winding 30, a high voltage level for the high voltage or ultor terminal 28 of kinescope 20.

The horizontal retrace pulses from horizontal deflection circuits 24 are also applied to a keying pulse generator 31 via a conductor R at a terminal 32. Terminal 32 is shown to illustrate that keying pulse generator 31 may be incorporated as a portion of an integrated circuit, for example, with other receiver circuits such as horizontal and vertical deflection oscillators. Differentiated horizontal synchronizing pulses are applied from conductor H to keying pulse generator 31 at a terminal 33.

The horizontal retrace pulses are applied to a buffer 34 and are then applied to a summation circuit 35. A reference voltage established by an internal clip level circuit 36 is applied to summation circuit 35. Buffer 34 provides isolation between summation circuit 35 and components external to the integrated circuit. The horizontal synchronizing pulses are inverted by inverter 37 and are also applied to summation circuit 35.

Figure 2:
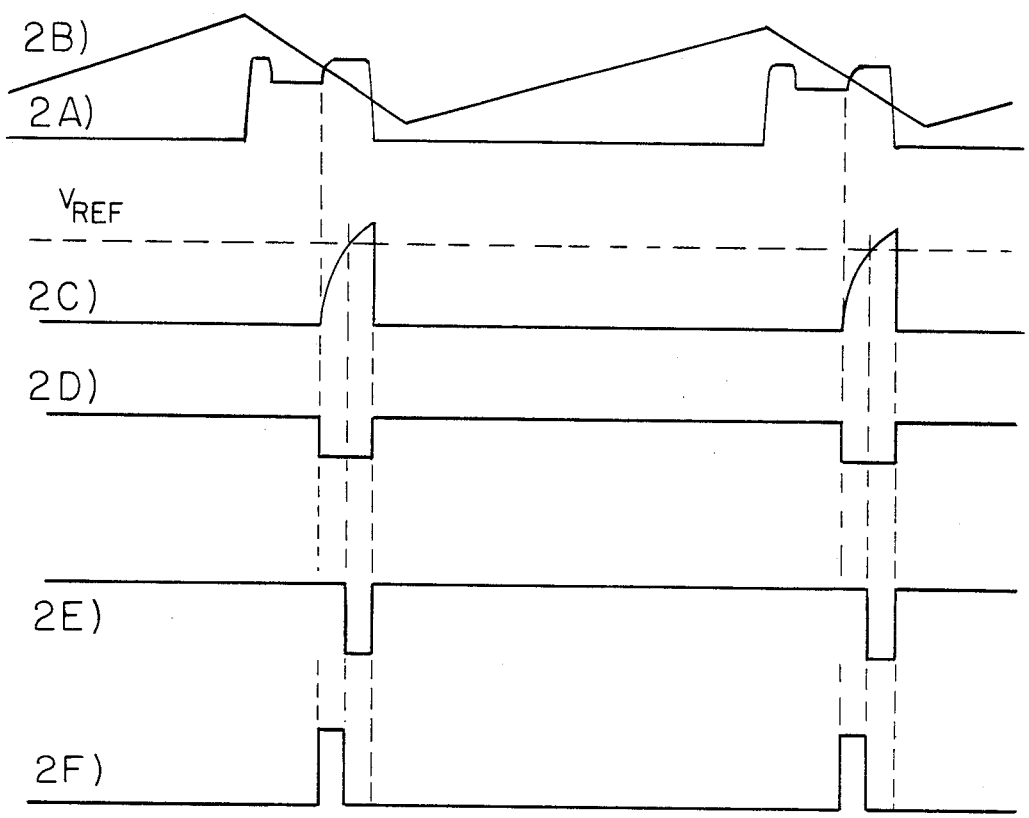
FIGS. 2 and 3 illustrate waveforms relating to the operation of the keying pulse generator shown in FIG. 1.

Summation circuit 35 operates on the three input signals in a manner which will be described later and provide a composite output signal as shown in FIG. 2A to one input of a comparator 40. The other input to comparator 40 is a horizontal rate sawtooth signal, shown in FIG. 2B, derived from the horizontal retrace pulses by a sawtooth generator circuit 41. The output of comparator 40 goes low when the level of the sawtooth signal of FIG. 2B falls below the composite signal of FIG. 2A.

A capacitor 42 is charged through a resistor 43 from a voltage supply +V and is coupled to a terminal 44 of keying pulse generator 31. The charging of capacitor 42 is initiated by the output from comparator 40 going low which turns off transistor 45, causing its collector to go high and allowing current flowing in resistor 43, to charge capacitor 42. The capacitor charging voltage, as shown in FIG. 2C, is applied to one input of a second comparator 46. A reference voltage level ($V_{REF}$ in FIG. 2C) derived from the +V voltage supply by action of a voltage divider 50 is applied to the other input of comparator 46. The output of comparator 40, shown in FIG. 2D, is inverted by an inverter 63 and combined with the output of comparator 46 shown in FIG. 2E to form the desired keying pulse, as shown in FIG. 2F, which is provided at a terminal 51 of keying pulse generator 31. The keying pulse at terminal 51 may be applied, as previously described, to luminance and chrominance processing circuits 13.

The initiation of the keying pulse occurs when the output of comparator 40 goes low. This also causes capacitor 42 to begin charging. When the voltage level on capacitor 42, present at one input of comparator 46, exceeds the voltage level $V_{REF}$ at the other input established by voltage divider 50, the output of comparator 46 goes low, causing the keying pulse at terminal 51 to be terminated. The keying pulse will only occur, therefore, during the time that capacitor 42 is charging to the $V_{REF}$ level, which is a fixed, predetermined interval, so that the keying pulse will always be of constant width or duration.

Figure 3:
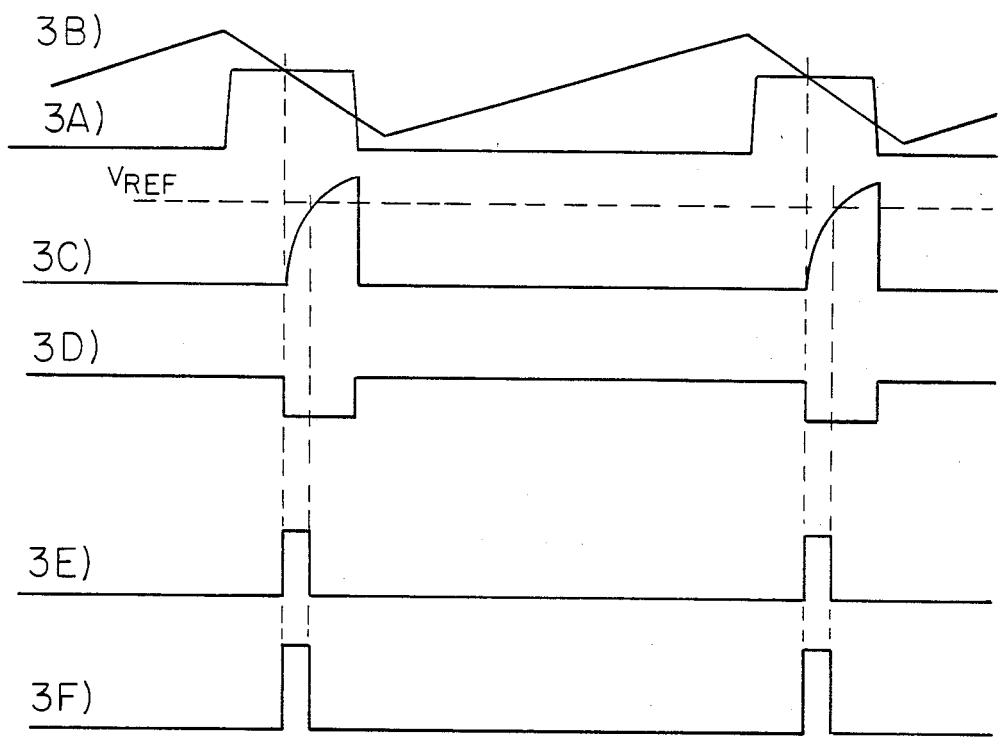

The previously described keying pulse generator produces a keying pulse which, as will be explained in greater detail with reference to the specific embodiment of FIG. 4, has its initiation controlled by horizontal synchronizing pulses. During poor signal conditions, when the horizontal synchronizing pulses are distorted or missing, the horizontal retrace pulses alone provide the initiation of the keying pulses. This is illustratively shown in FIG. 3. The waveforms of FIG. 3 appear in the circuit of FIG. 1 at the same locations as the corresponding waveforms of FIG. 2. FIG. 3A illustrates the output of summation circuit 35 when horizontal sync pulses are missing. The charging of capacitor 42, shown in FIG. 3C, and the initiation of the keying pulse, shown in FIG. 3F, again occur when the decreasing horizontal retrace derived sawtooth signal, illustrated in FIG. 3B, falls below the level of the summation circuit output signal of FIG. 3A. It can be seen that the keying pulse occurs at a point earlier in time when horizontal synchronizing pulses are missing. The width of the keying pulses, however, remains constant, since they depend on the fixed charging interval of capacitor 42.

Figure 4:
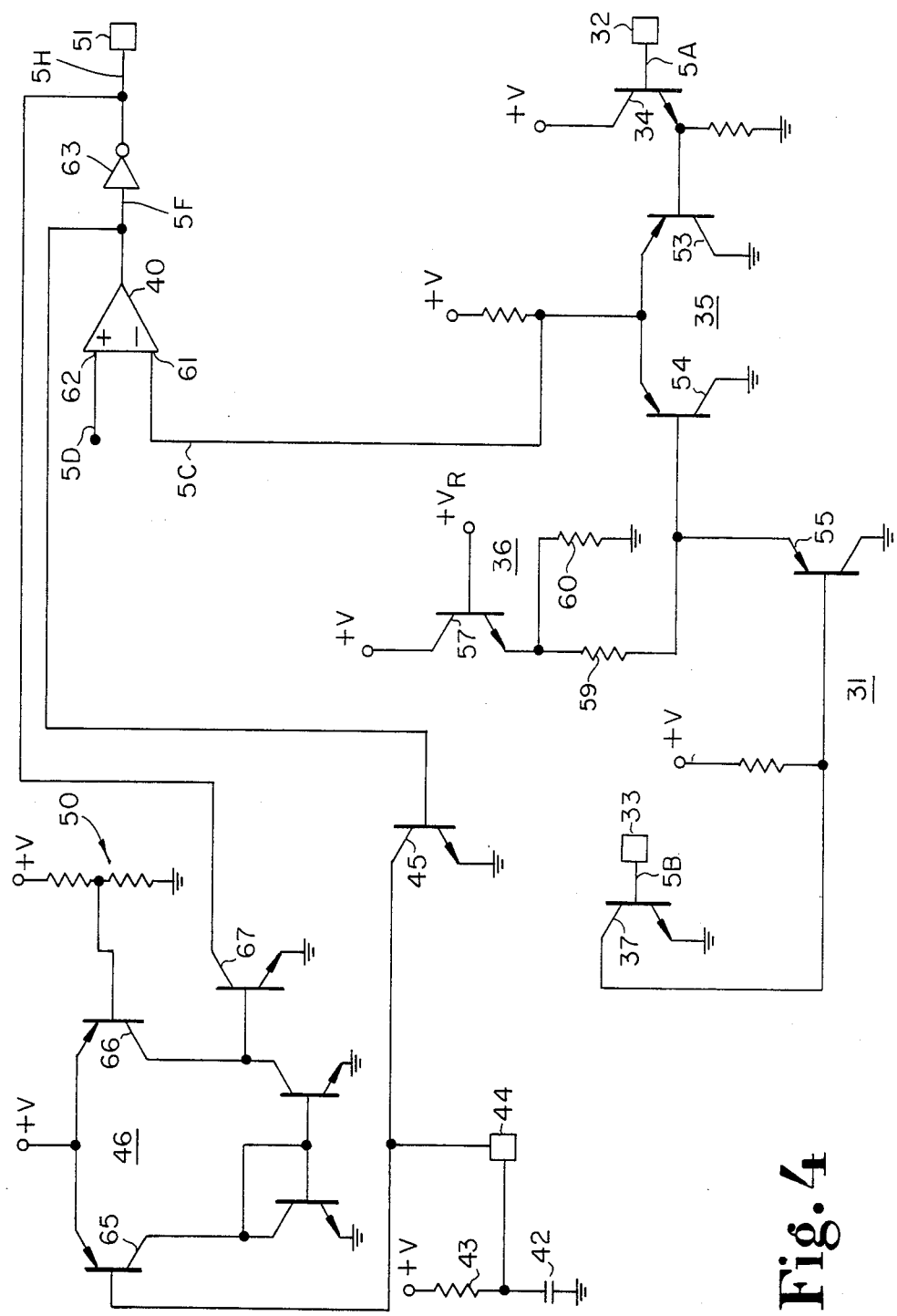
FIG. 4 is a schematic diagram of a keying pulse generator constructed in accordance with the present invention.

Referring to FIG. 4, there is shown an embodiment of keying pulse generator 31 of FIG. 1 as incorporated as a portion of an integrated circuit. Corresponding circuit elements in FIG. 1 and FIG. 4 are identified with the same numerical designation.

Figure 5:
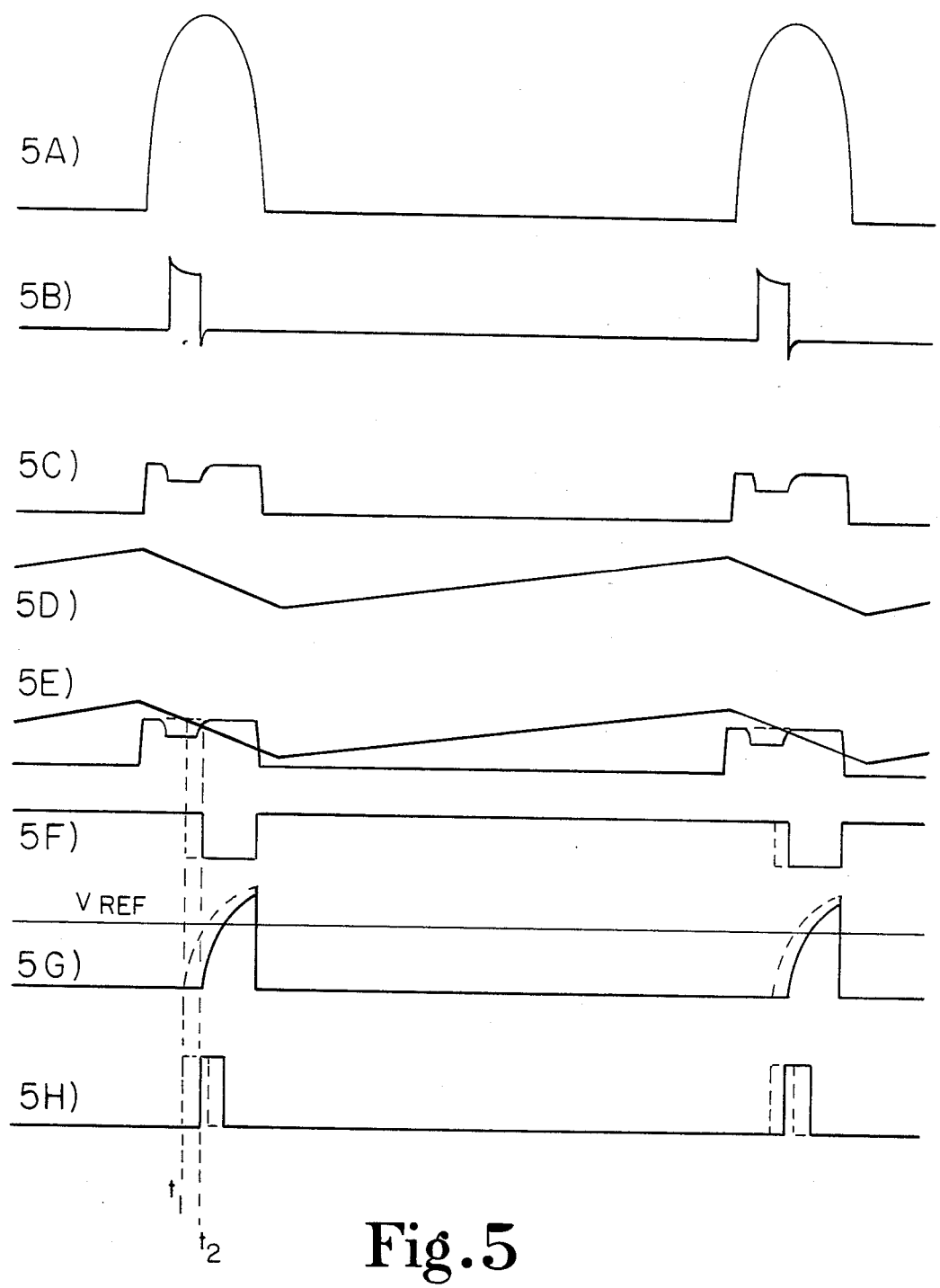
FIG. 5 illustrates waveforms associated with the circuit shown in FIG. 4.

Horizontal retrace or flyback pulses, shown in FIG. 5A, are applied via integrated circuit terminal 32 to the base of buffer transistor 34 which is coupled to summation circuit 35. Summation circuit 35 also comprises transistors 53, 54 and 55 which are connected to form a nonadditive mixer with an output at the junction of the emitters of transistors 53 and 54. The output of summation circuit 35 represents the lower amplitude signal of the signals present at the bases of transistors 53 and 54 at a given instant. As described, horizontal retrace pulses appear at one input. Another summation circuit input signal is derived from horizontal synchronizing related pulses applied to the base of transistor 55 and a clip level signal applied to the base of transistor 54. The horizontal synchronizing pulses, shown in FIG. 5B, are applied to transistor 55 from integrated circuit terminal 33 via transistor 37. The clip level signal is formed by internal clip level circuit 36 comprising a transistor 57 and resistors 59 and 60. The level of the drive signal $+V_R$ is controlled to track with the +V collector supply, thereby resulting in a predetermined voltage level being applied to the base of transistor 54.

In the absence of horizontal synchronizing pulses, the output of summation circuit 35 will be a truncated horizontal retrace pulse, having an amplitude determined by the clip level signal. The presence of horizontal synchronizing pulses causes a notch to be formed in the truncated retrace pulse, forming a signal such as is shown in FIG. 5C. This signal is applied to input terminal 61 of comparator 40. The dashed portion in FIG. 5E indicates the waveform shape in the absence of horizontal synchronizing pulses.

The input to terminal 62 of comparator 40 is a horizontal rate sawtooth signal, shown in FIG. 5D, that is generated by a horizontal rate oscillator. The oscillator may be part of the same integrated circuit as keying pulse generator 31. FIG. 5E illustrates the comparison of the two inputs of comparator 40.

The output state of comparator 40 changes when the declining horizontal rate sawtooth signal at input terminal 62 falls below the level of the signal at input terminal 61. As can be seen in FIG. 5F, the output state of comparator 40 illustratively changes to a low state at a time $t_1$ when horizontal synchronizing pulses are absent and at a time $t_2$ under normal operating conditions when the synchronizing pulses are present. When the output of comparator 40 goes low, the output of inverter 63, and hence output terminal 51, goes high, initiating the keying pulse as shown in FIG. 5H.

During most of the horizontal interval, the output of comparator 40 is high, causing transistor 45 to be saturated such that the collector of transistor 45 is low, thereby maintaining capacitor 42 discharged. When the output of comparator 40 goes low, transistor 45 is cut off, allowing capacitor 42 to charge. Resistor 43 and capacitor 42 are located external to the integrated circuit incorporating keying pulse generator 31. The voltage level developed across charging capacitor 42, shown in FIG. 5G, is applied via integrated circuit interface terminal 44 to the base of a transistor 65, which comprises one input of comparator 46. The dashed line in FIG. 5G represents the charging of capacitor 42 when horizontal synchronizing pulses are absent. The other input of comparator 46, which is the base of a transistor 66, receives a reference level, also shown in FIG. 5G, derived from the +V voltage supply via voltage divider 50.

When the voltage across capacitor 42 reaches the reference level established by voltage divider 50, transistor 66 is turned on, bringing its collector high. This causes transistor 67 to be turned on, which brings its collector, and the output of inverter 63, low. This causes the keying pulse at the output of inverter 63 and terminal 51 to be terminated, as shown in FIG. 5H. The dashed lines represent a keying pulse generated in the absence of horizontal sync pulses. Both the charging voltage across capacitor 42 and the reference level at the base of transistor 66 are derived from the same voltage supply, illustratively shown as the +V supply in FIG. 4. Changes in the +V voltage level due to circuit loading or other factors will not change the relationship between the capacitor 42 voltage and the reference voltage. The time required for capacitor 42 to reach the reference voltage level will therefore be constant independent of changes in the +V voltage supply. The width of the keying pulse will therefore be constant despite variations in the +V voltage supply level and the presence or quality of the horizontal synchronizing pulses. The location of the horizontal synchronizing pulse component within the horizontal retrace interval will not affect the width of the keying pulse. Horizontal retrace pulse phase shift due to beam current loading will not cause a change in the keying pulse width, so that reliable burst gate operation is provided under all receiver operating conditions.

What is claimed is:

1. In a television receiver incorporating a source of horizontal retrace pulses and a source of horizontal synchronizing pulses, apparatus for generating a keying pulse during a portion of a given horizontal scan line comprising:

means coupled to said source of horizontal retrace pulses and to said source or horizontal synchronizing pulses for initiating said keying pulse in response to said horizontal synchronizing pulses when the amplitude of said synchronizing pulses exceeds a predetermined level and for initiating said keying pulse in response to said horizontal retrace pulses when the amplitude of said synchronizing pulses is below said predetermined level; and means responsive to said initiation of said keying pulse for terminating said keying pulse after a predetermined interval comprising:

a capacitor;

a source of potential coupled to said capacitor;

means coupled to said capacitor and to said source of potential and responsive to the initiation of said keying pulse for causing said capacitor to be charged from said source of potential;

means coupled to said source of potential for providing a reference voltage; and a comparator having a first input coupled to said capacitor and a second input coupled to said means for providing a reference voltage, and having an output coupled to said means for initiating said keying pulse.

* * * * *